United States Patent [19]

Hirai

[11] Patent Number: 5,740,281
[45] Date of Patent: Apr. 14, 1998

[54] METHOD OF COMPRESSING AND DECODING SHAPE-DATA

[75] Inventor: Makoto Hirai, Suita, Japan

[73] Assignee: Matsushita Electric Industrial Co., Ltd., Osaka, Japan

[21] Appl. No.: 364,242

[22] Filed: Dec. 27, 1994

[30] Foreign Application Priority Data

Dec. 27, 1993 [JP] Japan ................... 5-333859

[51] Int. Cl.$^6$ ................... G06K 9/46
[52] U.S. Cl. ................... 382/243
[58] Field of Search ................... 382/197, 199, 382/202, 203, 240, 241, 242, 243

[56] References Cited

U.S. PATENT DOCUMENTS

| | | | |
|---|---|---|---|
| 5,231,676 | 7/1993 | Mahoney | 382/242 |
| 5,280,547 | 1/1994 | Mahoney | 382/240 |
| 5,533,148 | 7/1996 | Sayan et al. | 382/243 |
| 5,546,477 | 8/1996 | Knowles et al. | 382/242 |

OTHER PUBLICATIONS

Portable Video Research Group, Stanford University, "PVRG-MPEG CODEC 1.1", Andy C. Hung, Mar. 1, 1993.

*Primary Examiner*—Jose L. Couso
*Attorney, Agent, or Firm*—Wenderoth, Lind & Ponack

[57] ABSTRACT

A method of compressing shape-data used for an image generating apparatus comprises steps of inputting shape-data for each part of the whole shape, seeking a distribution of coordinate values of the shape-data for each part and determining parameters for quantizing each coordinate value for each part and quantizing each coordinate value for each part based on the parameters determined in the foregoing step, and a method of decoding compressed shape-data is also disclosed.

19 Claims, 6 Drawing Sheets

# 5,740,281

METHOD OF COMPRESSING AND DECODING SHAPE-DATA

BACKGROUND OF THE INVENTION

1. Field of the Invention

The present invention relates to a method of compressing and decoding shape-data that are used in an image generating apparatus.

2. Description of the Related Art

In conventional image generating apparatuses, a methods of approximating a surface by polygonal patches or parametric surfaces have been employed in order to reduce the amount of shape-data (For example, Japanese Pat. Appl. Hei 4-202151, Input device for three dimensional shape). FIG. 6 illustrates an example of approximating a surface by polygonal patches in a prior method for reducing the amount of data. A curved surface 60 is approximated by polyhedrons 61, each of which is expressed by a polygonal patch.

However, in the above prior method, as the number of vertices of polygonal patches or feature points of parametric surfaces is reduced, the smoothness of the surface is lost and approximation errors become greater.

SUMMARY OF THE INVENTION

An object of the present invention is therefore to reduce the amount of shape-data without reducing the number of feature points such as the vertices of polygonal patches.

In order to achieve the aforementioned objective, according to a first method of compressing shape-data in the present invention, for each part of a plurality of parts into which a whole shape is divided, the distribution of each coordinate of shape-data is obtained to determine quantization parameters, and each coordinate of shape-data is quantized therewith, so that each coordinate is optimally quantized for each part and the number of bits required for expressing the coordinate can be reduced.

Further, according to a first method of decoding the shape-data compressed by the aforementioned first method, for each part of the above parts, each coordinate is inverse-quantized with inverse-quantization parameters for decoding, so that each coordinate is optimally inverse-quantized for each part and the number of bits required for expressing the coordinate can be reduced.

Further, according to a second method of compression and decoding of the shape-data in accordance with the present invention, the parameters of an inverse quantizing and coordinate transformation obtained by combining the inverse-quantization of the first method and a coordinate transformation for a part shape is used for decoding in place of the inverse-quantization parameters of the first method, so that the parameters of the inverse quantizing and coordinate transformation are not necessarily expressed separately. Therefore, not only is the amount of shape-data reduced, but also the number of operations is reduced, since the inverse quantization processing and the coordinate transformation processing are performed together during decoding.

According to a third method of compression and decoding of the shape-data in accordance with the present invention, the above first and second methods are recursively applied to a hierarchically structured parts construction, so that the distribution range of each coordinate of shape-data is hierarchically narrowed and an optimal quantization is made possible.

According to a fourth method of compression and decoding of the shape-data in accordance with the present invention, each coordinate of shape-data for each part is transformed into a principal axis coordinate system in the above second method, and the parameters of a coordinate transformation for a part shape obtained by correction based on the parameters of the principal axis transformation are used, so that the distribution range of each coordinate of shape-data can be narrowed. Therefore, an optimal quantization is made possible and the number of operations is reduced, since the inverse quantization processing, the inverse principal axis transformation processing, and the coordinate transformation processing are performed together during decoding.

According to a fifth method of compression and decoding of the shape-date in accordance with the present invention, each coordinate of shape-data for each part is transformed into a cylindrical coordinate system or a spherical coordinate system in the above second method, and the parameters of a coordinate transformation for a part shape obtained by correction based on the parameters of the cylindrical or spherical coordinate transformation are used, so that the coordinate values of a point on a sphere or a cylinder and the components of a unit-length vector are optimally quantized. Further, the number of operations is reduced, since the inverse quantization processing, the inverse coordinate system transformation processing, and the coordinate transformation processing are performed together during decoding.

According to a sixth method of compression and decoding of the shape-data in accordance with the present invention, part or all of the parameters of the inverse quantizing and coordinate transformation in the above third method are compressed and decoded as the shape-data of the part on the level which is one level higher than the current part, so that the parameters of the inverse quantizing and coordinate transformation are optimally quantized for each part. Therefore, the number of bits required for expressing coordinates can be reduced.

According to a seventh method of compression of the shape-data in accordance with the present invention, data for a shape not divided into parts is input, the distribution of each coordinate of the shape-data is obtained, the distribution range is divided, and shape-data for partitioned parts is obtained. After these procedures are performed, the first and second methods are applied to the shape-data for the partitioned parts. Therefore, each coordinate is optimally quantized for each part, so that the number of bits required for expressing coordinates can be reduced.

BRIEF DESCRIPTION OF THE DRAWINGS

These and other objects and features of the present invention will become clear from the following description taken in conjunction with the preferred embodiments thereof with reference to the accompanying drawings throughout in which like parts are designated by like reference numerals, and in which.

DETAILED DESCRIPTION OF THE PREFERRED EMBODIMENTS

Figure 1:
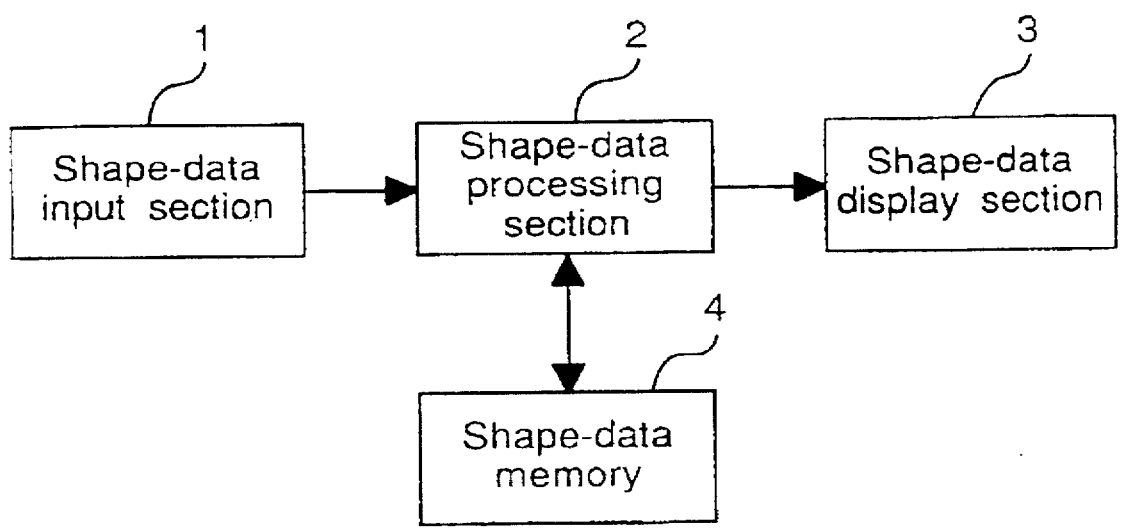
FIG. 1 shows a block diagram of an image generating system of an embodiment in accordance with the present invention.

A preferred embodiment in accordance with the present invention will be described below with reference to the attached drawings. FIG. 1 shows a block diagram of an image generating system of an embodiment for implementing the method of the present invention.

In FIG. 1, 1 is a shape-data input section that reads shape-data. 2 is a shape-data processing section that performs compression processing of shape-data and stores the compressed shape-data in a shape-data memory 4. Shape-data processing section 2 also reads the compressed shape-data stored in shape-data memory 4 if necessary, performs decode processing, and displays a shape image on a shape-data display section 3.

Figure 2:
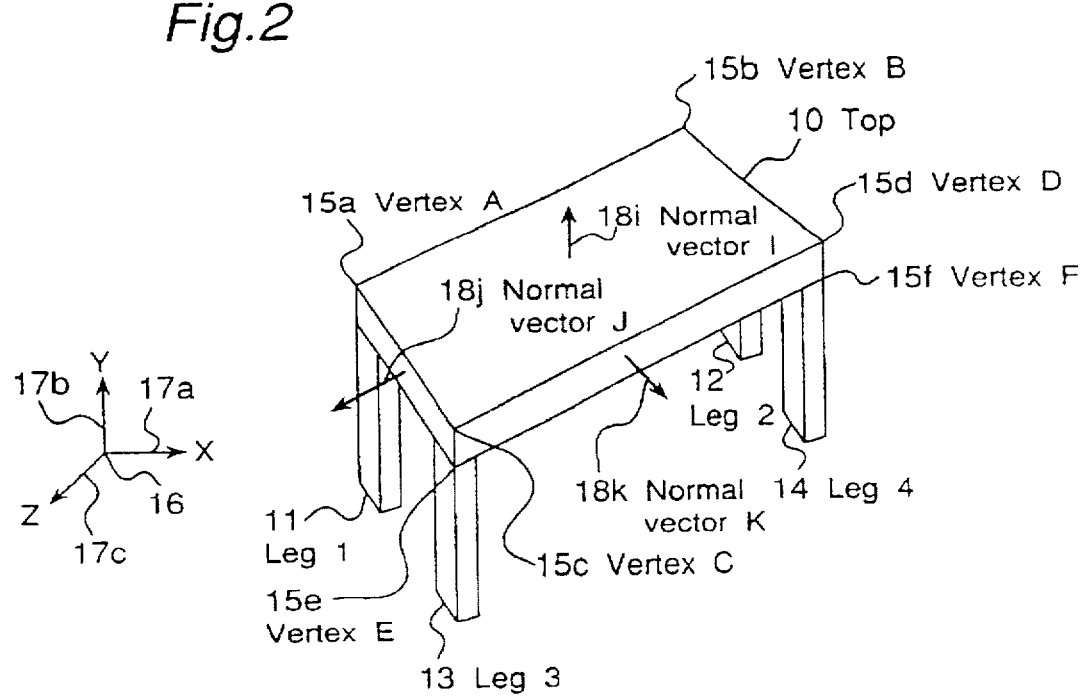
FIG. 2 shows an example of hierarchically structured part shapes.

FIG. 2 shows an example of hierarchically structured part shapes. In FIG. 2, the shape-data of a table is expressed by a coordinate system with a coordinate origin 16 and coordinate axes X, Y and Z. The whole table is hierarchically composed of parts, a top 10 and four legs 11–14. The shape-data of each of top 10 and legs 11–14 consists of eight vertices, incidence information that shows which four vertices of the eight vertices are the vertices of each face of each part, and the normal vectors of the faces. FIG. 2 shows six vertices A–F of top 10 and normal vectors I–K of three faces.

Figure 3:
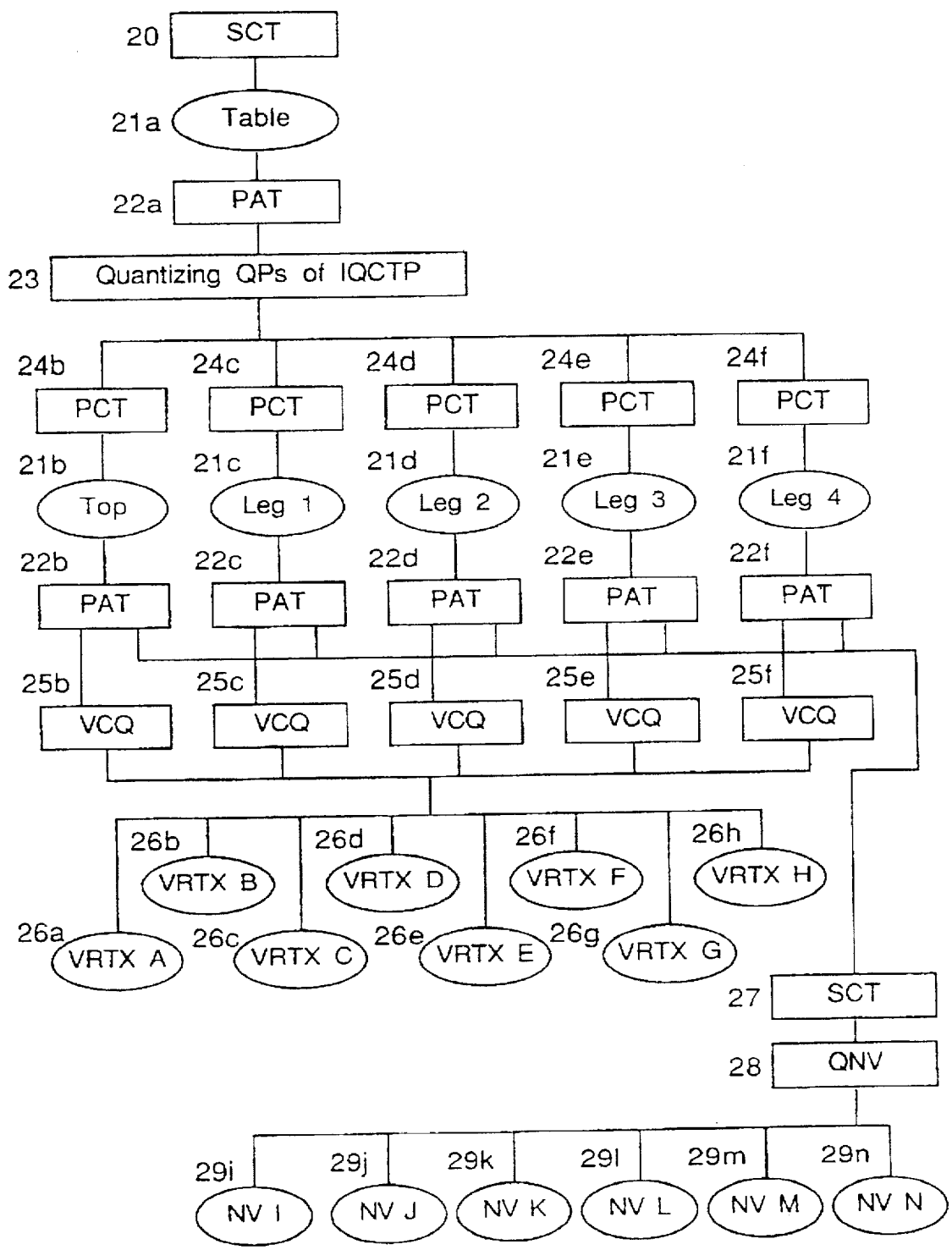
FIG. 3 shows the construction of compressed shape-data of the present embodiment for the hierarchically structured parts shape of FIG. 2.

FIG. 3 shows the construction of shape-data compressed by the present embodiment for the hierarchically structured part shapes shown in FIG. 2. In FIG. 3, table data 21a is composed of data 21b of the top 10 and the data 21c–21f of the four legs 11–14, and top data 21b and legs data 21c–21f share data 26a–26h of eight vertices A–H and the data 29i–29n of six normal vectors I–N. In FIG. 3, the incidence information of vertices is omitted. Described next is how the coordinate system (X, Y, Z), the positions of the vertices in a screen coordinate system, and the directions of the normal vectors are expressed for the construction example of compressed shape-data in FIG. 3.

The data 26a–26h of eight vertices A–H are compressed 3-dimensional coordinate vectors that show positions of the vertices. Vertices data 26a–26h are inverse-quantized based on quantized data 25b for vertex coordinates of the top. Then by inverse-principal-axis-transforming them based on principal axis transformation data 22b for the top, the 3-dimensional coordinate values of the positions of the vertices A–H of the top are obtained in a part coordinate system for the top. Further, vertices 26a–26h are inverse-quantized based on quantizing transformation data 25c for vertex coordinates of leg 1. Then by inverse-principal-axis transforming them based on principal axis transformation data 22c for leg 1, the 3-dimensional coordinate values of the positions of the vertices A–H of leg 1 are obtained in a part coordinate system for leg 1. Similar results are obtained for legs 2 to 4.

Normal vector data 29i–29n of six normal vectors I–N are compressed 3-dimensional vector values that show the directions of the faces. Normal vector data 29i–29n are inverse-quantized based on quantizing transformation data 28 for the normal vectors. Then by applying thereto the inverse of a spherical coordinate transformation 27, the 3-dimensional normal vectors I–N are obtained in a common part coordinate system obtained by the principal axis transformations of the respective part coordinate systems for the top and legs 1–4. Further, these normal vectors I–N are inverse-principal-axis-transformed based on principal axis transformation data 22b–22f from the common part coordinate system into the respective part coordinate systems. As a result, 3-dimensional normal vectors are obtained in the respective part coordinate systems for the top and legs 1–4.

Next, the vertex data A–H and normal vectors I–N expressed as data 21b in the part coordinate system for the top are inverse-coordinate-transformed based on the part coordinate transformation data 24b for the top, and then the data is further inverse-principal-axis-transformed based on the principal axis transformation data 22a for the table. As a result, the coordinates of vertices A–H and the components of normal vectors I–N are obtained in the original Cartesian coordinate system having the origin 16 and coordinate axes (X, Y, Z).

Quantization data 23 for the parameters of the inverse quantizing and coordinate transformation shows that the parameters of the inverse of the principal axis transformation data 22a for the table, which are part of the parameters of the inverse quantizing and coordinate transformation, are quantized and compressed. Therefore, the principal axis transformation data 22a are inverse-quantized based on the quantization data 23, and the resulting inverse principal axis transformation is used for the above calculation for obtaining the coordinates and components of the vertices and normal vectors in the original coordinate system.

Finally, a screen coordinate transformation 20 is necessary for generating an image by transforming coordinates from the above coordinate system (X, Y, Z) into a screen coordinate system.

Next is described a numerical example of constructing the compressed shape-data shown in FIG. 3.

Table 1 shows the coordinate values of vertices A to F of the eight vertices of the top in the coordinate system (X, Y, Z) and their corresponding coordinate values in the quantized coordinate system (X', Y', Z').

TABLE 1

|   | X     | Y   | Z      | X' | Y' | Z' |
|---|-------|-----|--------|----|----|----|
| A | 20    | 100 | 0      | 0  | 1  | 0  |
| B | 161.4 | 100 | −141.4 | 1  | 1  | 0  |
| C | 90.7  | 100 | 70.7   | 0  | 1  | 1  |
| D | 232.1 | 100 | −70.7  | 1  | 1  | 1  |
| E | 90.7  | 90  | 70.7   | 0  | 0  | 1  |
| F | 232.1 | 90  | −70.7  | 1  | 0  | 1  |

The following equation (1) shows the transformation from the coordinate system (X, Y, Z) into the coordinate system (X', Y', Z').

$$\begin{pmatrix} X \\ Y \\ Z \end{pmatrix} = \begin{pmatrix} 0.707 & 0 & 0.707 \\ 0 & 1 & 0 \\ -0.707 & 0 & 0.707 \end{pmatrix} \begin{pmatrix} 200 & 0 & 0 \\ 0 & 10 & 0 \\ 0 & 0 & 100 \end{pmatrix} \begin{pmatrix} X' \\ Y' \\ Z' \end{pmatrix} + \begin{pmatrix} 20 \\ 90 \\ 0 \end{pmatrix} = \quad (1)$$

$$(C_1 \, C_2 \, C_3) \begin{pmatrix} 200 & 0 & 0 \\ 0 & 10 & 0 \\ 0 & 0 & 100 \end{pmatrix} \begin{pmatrix} X' \\ Y' \\ Z' \end{pmatrix} + \begin{pmatrix} 20 \\ 90 \\ 0 \end{pmatrix}$$

In equation (1), the first matrix of its right side ($C_1$, $C_2$, $C_3$) represents an inverse of the principal axis transformation 22b for the top. The second matrix represents an inverse of the quantizing transformation 25b for vertices coordinates on the top. The second term of the right side of equation (1) is the vector of a parallel displacement and represents an inverse of the part coordinate transformation 24b for the top. As is clear from Table 1, the quantized coordinate values (X', Y', Z') are expressed using 3 bits for each vertex with each coordinate expressed using 1 bit, so that the amount of data is reduced.

In order to perform the quantization shown by equation (1), first the distribution range of each coordinate value is narrowed by the principal axis transformation. The matrix $(C_1, C_2, C_3)$ of the principal axis transformation is obtained by the following procedure.

The first step in the procedure is to obtain the matrices of the coordinate transformations for all combinations of one vortex as a new origin and other three vertices on new axes chosen from the eight vertices of the top and to select the matrix of a coordinate transformation that most reduces the amount of data. Each matrix of the above coordinate transformations is obtained first by translating the coordinates of the chosen three vertices with respect to the new origin and then the position vectors of the three vertices are normalized so that the length of each position vector becomes 1. Then the matrix composed of the normalized column vectors is the desired matrix. The above procedure is called a principal axis transformation because if the eight vertices are the vertices of a rectangular solid as in this example, then the directions of the three column vectors $C_1$, $C_2$, $C_3$ coincide with those of the principal axes of an ellipsoid that is circumscribed about the rectangular solid.

Next, the quantization width and quantization precision for each coordinate is obtained as inverse-quantization parameters from the distribution range and concentrated values of each coordinate that has been transformed by the principal axis transformation. In the example of quantization shown in equation (1), the values of the X coordinate transformed by the principal axis transformation are concentrated at 14, 14 and 214, 14. Therefore the quantization width is determined to be 200 and the quantization precision is determined to be 1 bit for the X' coordinate. Similarly, the quantization width and quantization precision for the Y' coordinate are respectively determined to be 10 and 1 bit, and the quantization width and quantization precision for the Z' coordinate are respectively determined to be 100 and 1 bit. Either one or both of the quantization width or the quantization precision can be used as inverse-quantization parameters.

Table 2 shows the correspondence between the coordinates of the column vectors of the principal axis transformation for the top and their expressions in a spherical coordinate system (r, θ, φ).

TABLE 2

|   | X | Y | Z | r | θ | φ |
|---|---|---|---|---|---|---|
| $C_1$ | 0.707 | 0 | −0.707 | 1 | 0·π/2 | 3·π/4 |
| $C_2$ | 0 | 1 | 0 | 1 | 1·π/2 | 0·π/4 |
| $C_3$ | 0.707 | 0 | 0.707 | 1 | 0·π/2 | 1·π/4 |

The transformation between these expressions is shown in the following equation (2).

$$\begin{pmatrix} X \\ Y \\ Z \end{pmatrix} = \begin{pmatrix} 1 & 0 & 0 \\ 0 & \cos\theta & \sin\theta \\ 0 & -\sin\theta & \cos\theta \end{pmatrix} \begin{pmatrix} r\sin\phi \\ 0 \\ r\cos\phi \end{pmatrix} = \begin{pmatrix} r\sin\phi \\ r\cos\phi \sin\theta \\ r\cos\phi \cos\theta \end{pmatrix} \quad (2)$$

The value of r is fixed to 1 and can be expressed with 0 bit. The value of θ is quantized in units of π/2 to take 0 or π/2 and can be expressed with 1 bit. The value of φ is quantized in units of π/4 to take eight different values between 0 and 7π/4 and can be expressed with 3 bits. Therefore the principal axis transformation can be expressed with total 12 bits, so that the amount of data can be reduced by using the spherical coordinate expression.

Table 3 shows the coordinate values of the normal vectors I-K of the top in the coordinate system (X, Y, Z), the coordinate values (X", Y", Z") obtained by the principal axis transformation, and the coordinate values quantized by transforming into the spherical coordinate system (r, θ, φ).

TABLE 3

|   | X | Y | Z | X" | Y" | Z" | r | θ | φ |
|---|---|---|---|---|---|---|---|---|---|
| I | 0 | 1 | 0 | 0 | 1 | 0 | 1 | 1·π/2 | 0·π/2 |
| J | −0.707 | 0 | 0.707 | −1 | 0 | 0 | 1 | 0·π/2 | 3·π/2 |
| K | 0.707 | 0 | 0.707 | 0 | 0 | 1 | 1 | 0·π/2 | 0·π/2 |

The transformations showing the relation between the three coordinate systems are shown in the following equation (3).

$$\begin{pmatrix} X \\ Y \\ Z \end{pmatrix} = (C_1\, C_2\, C_3) \begin{pmatrix} X" \\ Y" \\ Z" \end{pmatrix} = (C_1\, C_2\, C_3) \begin{pmatrix} r\sin\phi \\ r\cos\phi \sin\theta \\ r\cos\phi \cos\theta \end{pmatrix} \quad (3)$$

The value of r is fixed to 1 and can be expressed with no bit. The value of θ is quantized in units of π/2 to take 0 or π/2 and can be expressed with 1 bit. The value of φ is quantized in units of π/2 to take four different values between 0 and 3π/2 and can be expressed with 2 bits. Therefore each normal vector is expressed with 3 bits, so that the amount of data can be reduced by using the spherical coordinate expression.

Further, by the above quantization, the eight vertices A to H and the six normal vectors I to N of the top and four legs share the same values with the principal axis transformation 22b, so that the amount of data can be further reduced.

An example of the flow of the processing of constructing shape-data compressed as above from input non-compressed shape-data is described in the following. Input shape-data is sometimes partitioned into parts beforehand such as the top and legs and sometimes not partitioned into parts. Both cases are described in the following.

The above example of shape-data has two levels of hierarchy, with the table as one part on the first level and the top and legs as parts on the second level. In general, the number of levels may be more than two. Therefore, assuming a general number of levels in the hierarchical structure, the subroutine for processing on any level is described by the following. If processing for the level which is one level lower than the current level is required during executing the subroutine, then temporarily halting the current processing and recursively starting the same subroutine from its beginning for the lower level and, after finishing the lower level processing, the process returns to the halting point to resume the current processing.

Figure 4:
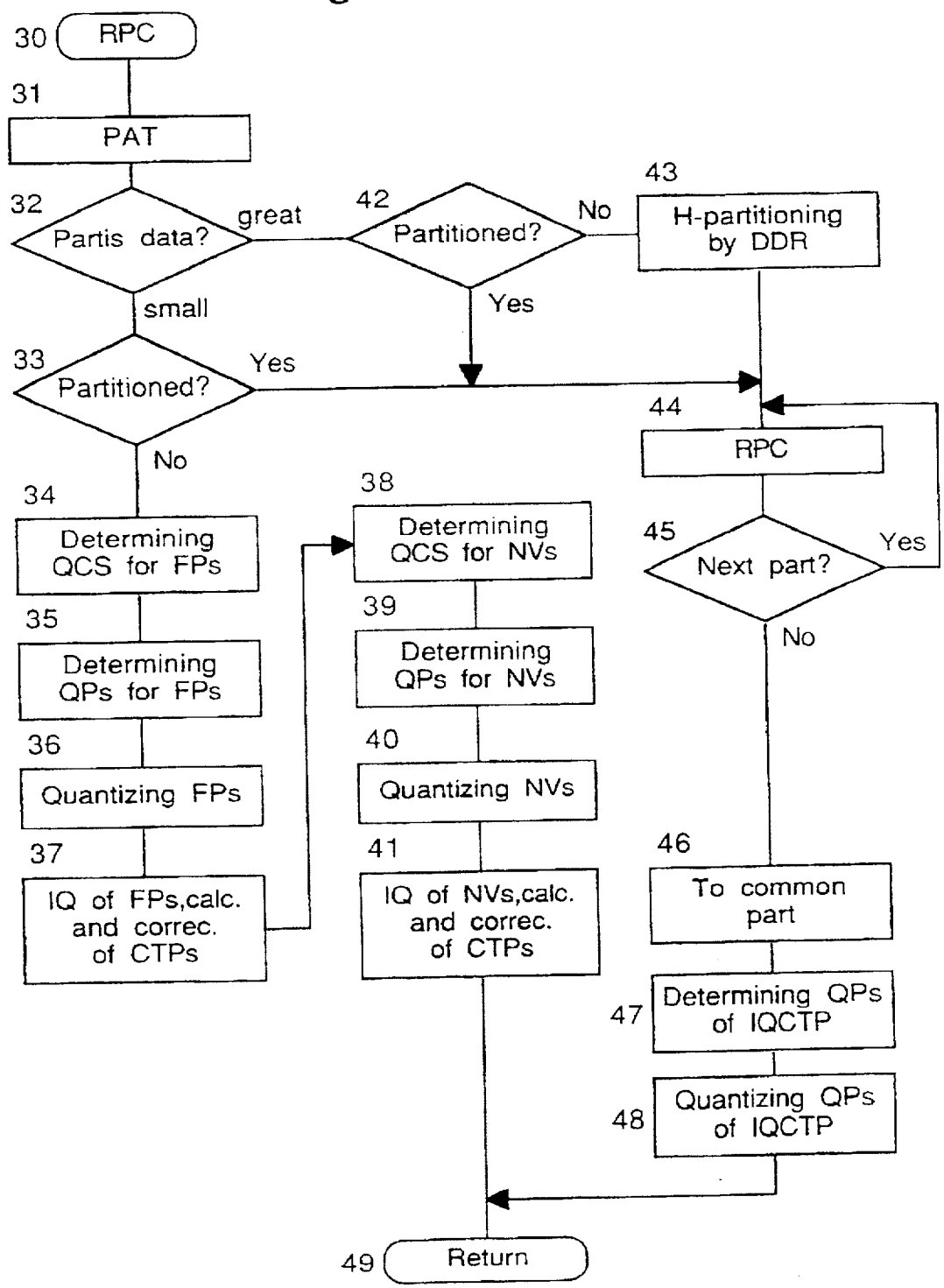
FIG. 4 shows a flow chart of the subroutine for recursive part-compressions of the present embodiment in accordance with the present invention.

FIG. 4 shows a flow chart of the recursive subroutine for part-compressions of an embodiment in accordance with the present invention. In FIG. 4, 30 is the starting point for the recursive subroutine for part-compressions, and 44 shows the recursive execution of the same recursive subroutine for part-compressions on the lower level. 49 shows a return from the recursive execution of the subroutine, and a return from the recursive execution of the subroutine for the uppermost level indicates the end of the compression processing.

In the following, compression processing for the example of shape-data for the table shown in FIGS. 2 and 3 is described with reference to the flowchart of FIG. 4. If the shape-data for the current part is not partitioned, all vertice data and normal vector data are given on the current level. First, the distribution range of each coordinate of the shape-data is narrowed by principal axis transformation processing 31. The contents of this processing have already been described in the example of constructing compressed shape-data with reference to FIG. 3. However, if the number of vertices for the current part is too large such that a large amount of time would be required for principal axis transformation processing, it may be omitted.

Next, the amount of shape-data is determined based on the number of vertices of the current part. If the number of vertices of the current part is greater than a predetermined number and if hierarchical partitioning has not been performed, then a hierarchical partitioning procedure 43 for distribution range division is performed. In procedure 43, the vertices are divided into groups based on the incidence information so that each vertex is connected to each other within a group. Further, the distribution range of each coordinate of the vertices of a large group is obtained. If the ratio of the volume obtained by multiplying the three distribution ranges for a group to the volume obtained by multiplying the three distribution ranges for the whole level is greater than a predetermined value, then the group is further divided so that the numbers of vertices within divided groups become uniform and the divided groups are treated as parts on the level which is one level lower than the current level.

In the example of the shape-data shown in FIG. 2, the eight vertices comprising the top are connected to themselves and not connected to the vertices comprising the legs 1–4, so that the eight vertices comprising the top constitute one group. This group has few vertices, and the time required for the principal axis transformation processing is sufficiently short, so that this group need not be divided further. Similarly, each of the legs 1–4 becomes one group, so that the whole table is divided into 5 parts.

If the current vertices group is already partitioned, then steps 42 and 33 recognize the specification of the partition, and the divided groups are treated as parts on the level which is one level lower than the current level regardless of the number of vertices on the current level.

If the number of vertices of the current part is smaller than the predetermined number, and if further partitioning is not specified, the following procedure 34 is performed. If the number of vertices of the current part is smaller than the predetermined number, but if further partitioning is specified, then the process goes to step 44, which executes the recursive subroutine for parts-compression on the lower level. In the present example, if the current part is the top, then the process goes to step 34.

Procedure 34 is a quantization coordinate system determining procedure for feature points that determines a coordinate system from a Cartesian coordinate system, a cylindrical coordinate system, and a spherical coordinate system such that the coordinates of the vertices in the determined coordinate system is most compressively expressed.

Next, procedure 35, which is a quantization parameters determining procedure, determines the quantization width and the quantization precision. As described above for the example of constructing compressed shape-data in example 3, the distribution of each coordinate of the transformed coordinates of the vertices is examined, and the quantization width and quantization precision for each coordinate are determined so that the maximum quantization error is less than a predetermined admissible quantization error.

Next, a feature points quantization procedure 36 quantizes each coordinate of the vertices corresponding to the above quantization width and quantization precision.

Next, procedure 37 calculates the parameters of the inverse quantizing and the coordinate transformation for feature points and obtains the matrix and vector of the inverse quantizing and coordinate transformation, which is the composition of the inverse of the part coordinate transformation, the inverse of the principal axis transformation, and the inverse of the quantizing transformation, as shown in equation (1). Here, the inverse matrix of the quantizing transformation is a diagonal matrix each of whose diagonal elements is the quantization width for the corresponding coordinate. This procedure then selects one set of parameters from the set of parameters of pre-composition and the set of parameters of post-composition such that the selected set is more compressed than the other. In the example of FIG. 3, each inverse quantizing and coordinate transformation for part $21i$ for $i=b, c, \ldots, f$ of the top and four legs is the product of the inverses of transformations $24i$, $22i$ and $25i$.

Next, procedure 38 for determining the coordinate system for quantizing normal vectors to procedure 41 for calculating the parameters of the inverse quantizing and coordinate transformation for normal vectors perform compression processing for the normal vectors in parallel to procedures 34 to 37.

After finishing the recursive procedure 44, step 45 tests if another part is left for compression on the current level. If it is, the process goes back to procedure 44. If all parts on the current level have been processed for data compression, then procedure 46 searches for parts on the current level such that the compressed data of the parts can be shared with each other, and such data is shared.

In the example of shape-data in FIG. 2, the compressed data for the eight vertices and the six normal vectors of the top become the same to allow sharing. Further, if the principal axis transformations $22b$–$22f$ of the five parts become the same, then they can be shared. More particularly, in place of the principal axis transformations $22b$–$22f$ on the level of the top and legs and the principal axis transformation $22a$ on the level of the table, the composition of the principal axis transformation shared by $22b$–$22f$ and the principal axis transformation $22a$ can be used as a single principal axis transformation.

Next, procedure 47 examines the distributions of the parameters of each inverse quantizing and coordinate transformation on the current level, which is the composition of the inverse of a part coordinate transformation, the inverse of a principal axis transformation, and the inverse of a quantizing transformation, to determine the quantizing parameters for quantizing the shared parameters of the inverse quantizing and coordinate transformations on the current level. Finally, procedure 48 quantizes the shared parameters of the inverse quantizing and coordinate transformations if their data amount can be reduced by quantization. As described previously, in the example of shape-data in FIG. 2, the inverse matrix of the shared principal axis transformation is quantized in a spherical coordinate system as the quantized shared parameters of the inverse quantizing and coordinate transformations on the level of the top and legs.

As described above, the shape-data processing section 2 performs compression processing for input shape-data and stores the compressed shape-data in shape-data memory 4. The shape-data processing section 2 also reads the compressed shape-data stored in shape-data memory 4 and, if necessary, performs decode processing, and displays a shape image on a shape-data display section 3. An example of the flow of the processing of decoding and displaying the shape-data compressed as above is described in the following.

As compression processing, assuming a general number of levels in the hierarchical structure, the subroutine for processing on any level is described in the following. If processing for the level which is one level lower than the current level is required during executing the subroutine, then the current processing is temporarily halted and the same subroutine is recursively started from its beginning for the lower level and, after finishing the lower level processing, the process returns to the halting point to resume the current processing.

Figure 5:
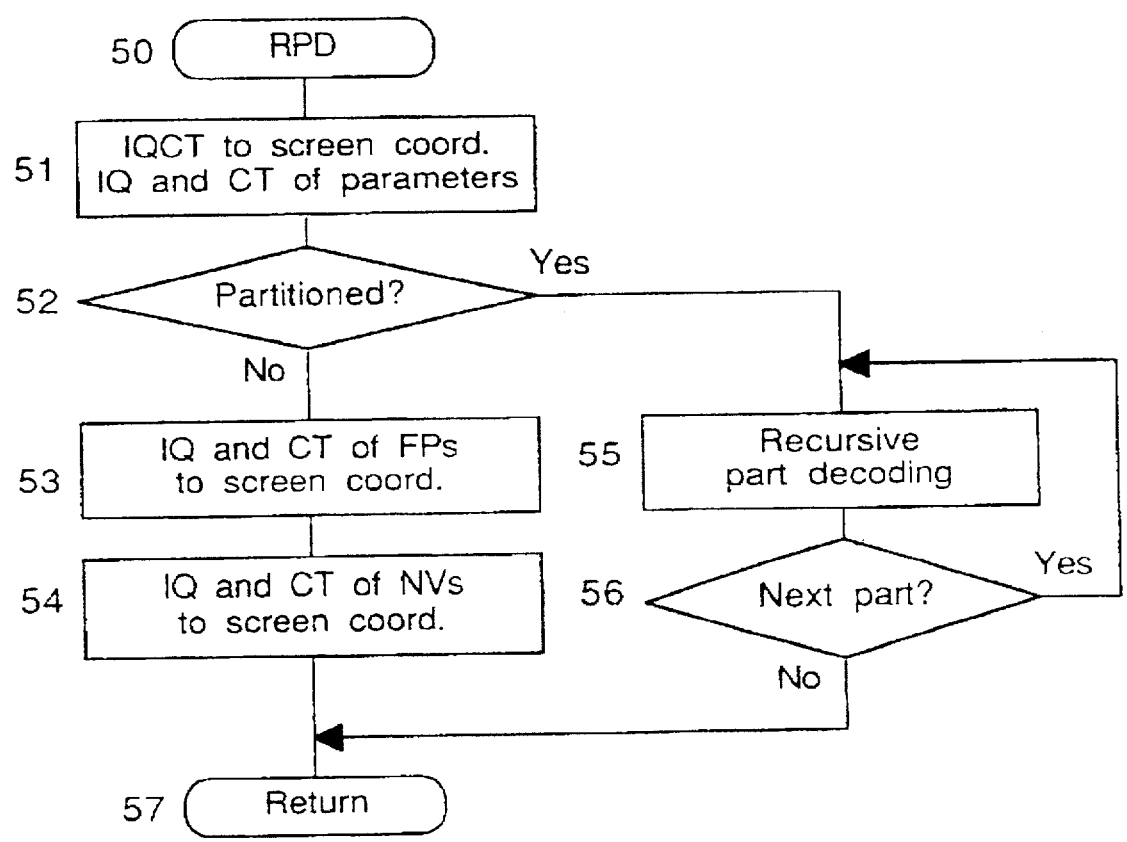
FIG. 5 shows a flow chart of the subroutine for recursive part-expansions of the present embodiment in accordance with the present invention.
Figure 6:
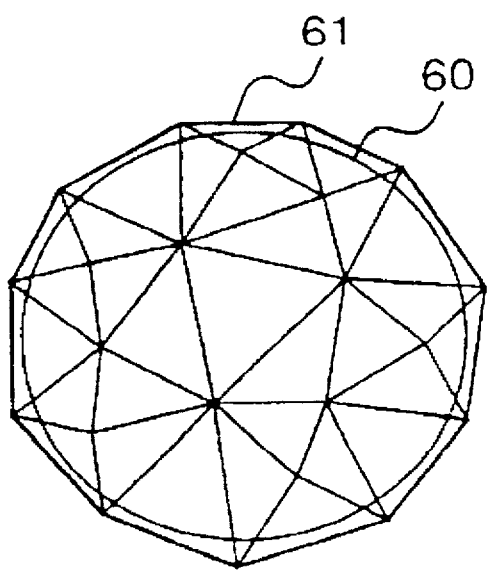
FIG. 6 shows an example of approximating a surface by polygonal patches in a prior method for reducing the amount of data.

FIG. 5 shows a flow chart of the recursive subroutine for parts-decoding of an embodiment in accordance with the present invention. In FIG. 5, 50 is the starting point for the recursive subroutine for parts-decoding, and 55 shows the recursive execution of the same recursive subroutine for parts-decoding on the lower level. 49 shows a return from the recursive execution of the subroutine, and a return from the recursive execution of the subroutine for the uppermost level indicates the end of the compression processing.

In the following, decode processing for the example of shape-data for the table shown in FIGS. 2 and 3 is described with reference to the flowchart of FIG. 5.

Before the execution of the recursive subroutine for parts-decoding, the parameters of the screen coordinate transformation 20 are given. In the example of shape-data in FIG. 2, for the execution of parts-decoding on the level of the table, these parameters are given as the matrix and vector of the transformation from the coordinate system (X, Y, Z) consisting of the origin 16 and coordinate axes X–Z into the screen coordinate system. For the execution of parts-decoding on the level of the top and legs, the matrix and vector of the transformation from the part coordinate systems for the top into the screen coordinate system are given.

First, procedure 51 inverse-quantizes and coordinate-transforms the parameters of the inverse quantizing and coordinate transformation into the screen coordinate system.

In the example of compressed shape-data in FIG. 3, for the execution of parts-expansion on the level of the table, the principal axis transformation 22a for the whole table, which is quantized in a spherical coordinate system, is inverse-quantized into the original Cartesian coordinate system to obtain the inverse quantizing and coordinate transformation. Then the inverse quantizing and coordinate transformation into the screen coordinate system is obtained by multiplying the above screen coordinate transformation 20 and the obtained inverse quantizing and coordinate transformation.

For the execution of parts-decoding of the top on the level of the top and legs, the matrix of the inverse quantizing and coordinate transformation into the screen coordinate system on the level of the table, the inverse of the part coordinate transformation 24b for the top, the inverse matrix of the principal axis transformation 22b, and the inverse matrix of the quantizing transformation 25 are combined to obtain the inverse quantizing and coordinate transformation into the screen coordinate system. If the inverse quantizing and coordinate transformation, which is the composition of the inverse of the part coordinate transformation, the inverse of the principal axis transformation, and the inverse of the quantizing transformation, is already given, the calculation is reduced.

If the current part is further partitioned, then the process goes to procedure 55 which recursively executes the subroutine for parts-expansion for a part on the level which one level lower than the current level. If the present part is not partitioned, then procedure 53 inverse-quantizes and coordinate-transforms the feature points such as vertices into the screen coordinate system for display using the parameters of the inverse quantizing and coordinate transformation obtained by procedure 51. Similarly, procedure 54 inverse-quantizes and coordinate-transforms the normal vectors for display.

As described above, according to a first method of compressing shape-data in accordance with the present invention, for each part of a plurality of parts into which a whole shape is divided, the distribution of each coordinate of shape-data is obtained to determine quantization parameters, and each coordinate of shape-data is quantized therewith, so that each coordinate is optimally quantized for each part and the number of bits required for expressing the coordinate can be reduced.

Further, according to a first method of decoding the shape-data, for each part of the above parts, each coordinate is inverse-quantized with inverse-quantization parameters for decoding, so that each coordinate is optimally inverse-quantized for each part and the number of bits required for expressing the coordinate can be reduced.

Further, according to a second method of compression and decoding of the shape-date in accordance with the present invention, the parameters of the inverse quantizing and coordinate transformation obtained by combining the inverse-quantization of the first method and a coordinate transformation for a part shape is used for decoding, so that the inverse-quantization parameters and coordinate transformation parameters do not have to be separately expressed. Therefore, not only is the amount of shape data reduced, but also the number of operations is reduced, since the inverse quantization processing and the coordinate transformation processing are performed together during decoding.

According to a third method of compression and decoding of the shape-data in accordance with the present invention, the above first and second methods are recursively applied to the hierarchical structure of a parts construction, so that the distribution range of each coordinate of shape-data is hierarchically narrowed and an optimal quantization is made possible.

According to a fourth method of compression and decoding of the shape-data in accordance with the present invention, each coordinate of shape-data for each part is transformed into a principal axis coordinate system, and the parameters of a coordinate transformation for a part shape obtained by correction based on the parameters of the principal axis transformation are used, so that the distribution range of each coordinate of shape-data can be narrowed to realize optimal quantization. Further, the number of operations is reduced, since the inverse quantization processing, the inverse principal axis transformation processing, and the coordinate transformation processing are performed together during decoding.

According to a fifth method of compression and decoding of the shape-data in accordance with the present invention, each coordinate of shape-data for each part is transformed into a cylindrical coordinate system or a spherical coordinate system in the above second method, and the parameters of a coordinate transformation for a part shape obtained by correction based on the parameters of the cylindrical or spherical coordinate transformation are used, so that the coordinate values of a point on a sphere or a cylinder and the components of a unit-length vector are optimally quantized. Further, the number of operations is reduced, since the inverse quantization processing, the inverse coordinate system transformation processing, and the coordinate transformation processing are performed together during decoding.

According to a sixth method of compression and decoding of the shape-date in accordance with the present invention, part or all of the parameters of the inverse quantizing and coordinate transformation are compressed and decoded as the shape-data of the part on the level which is one level higher than the current part, so that the parameters of the inverse quantizing and coordinate transformation are optimally quantized for each part. Therefore, the number of bits required for expressing coordinates can be reduced.

According to a seventh method of compression of the shape-data in accordance with the present invention, data for a shape not divided into parts is input, the distribution of each coordinate of the shape-data is obtained, the distribution range is divided, and shape-data for partitioned parts is obtained. After subsequent to these procedures, the above methods of compressing shape-data are applied to the shape-data for the partitioned parts. Therefore, each coordinate is optimally quantized for each part, so that the number of bits required for expressing coordinates can be reduced.

In the present embodiments, the feature points of shape-data have been vertices. However, if terminal points of lines, middle point of lines, vertices of surfaces, center points of surfaces, control points of surfaces, center points of ellipses, or center points of ellipsoids are used as feature points, then similar effects are obtained in equivalent methods.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

What is claimed is:

1. A method of compressing shape-data used in an image generating apparatus, said method comprising:
   a first step of inputting shape-data for a plurality of parts into the image generating apparatus, wherein the plurality of parts are obtained from partitioning a whole shape;
   a second step of obtaining a distribution of coordinate values of the shape-data for each part and determining quantizing parameters for quantizing each coordinate value of the shape-data for each part based on the respective distribution obtained;
   a third step of quantizing each coordinate value of the shape-data for each part using the quantizing parameters determined in said second step; and
   a fourth step of inputting part coordinate transformation parameters, which consist of data relating to the positional relationship of the plurality of parts, into the image generating apparatus and obtaining parameters of an inverse quantizing and coordinate transformation by calculating the part coordinate transformation parameters based on inverse quantizing parameters for inverse-quantizing the coordinate values which were quantized.

2. The method of compressing shape-data as in claim 1, wherein said first, second, third, and fourth steps are recursively executed to hierarchically compress shape-data which is hierarchically structured.

3. The method of compressing shape-data as in claim 2, wherein a portion of the parameters of the inverse quantizing and coordinate transformation obtained in said fourth step is compressed as shape-data for at least one part on a hierarchical level which is one level higher than the current level of hierarchy.

4. The method of compressing shape-data as in claim 1, wherein each coordinate value of shape-data for each part is principal-axis-transformed, and the parameters of the part coordinate transformation are corrected in said fourth step based upon the principal-axis-transformation of the shape-data.

5. The method of compressing shape-data as in claim 1, wherein each coordinate value of shape-data for each part is transformed into either a cylindrical coordinate system or a spherical coordinate system in said first step, and the parameters of the coordinate transformation are corrected in said fourth step based upon either the cylindrical or spherical coordinate transformation.

6. The method of compressing shape-data as in claim 1, wherein normal vectors of surfaces in each part are used as the shape-data.

7. The method of compressing shape-data as in claim 1, wherein said first step further comprises obtaining shape-data of the whole shape, obtaining a distribution of coordinate values of the whole shape, and partitioning the distribution of coordinate values so as to obtain the shape data for the plurality of parts.

8. A method of compressing shape-data used in an image generating apparatus, said method comprising:
   a first step of inputting shape data for a plurality of parts into the image generating apparatus, wherein the plurality of parts are obtained from partitioning a whole shape;
   a second step of obtaining a distribution of coordinate values of the shape-data for each part and determining quantizing parameters for quantizing each coordinate value of the shape-data for each part based on the respective distribution obtained; and
   a third step of quantizing each coordinate value of the shape-data for each part using the quantizing parameters determined in said second step;
   wherein one set of values selected from a set of quantization widths, a set of quantization precision, and a set of a quantization width and a quantization precision is used as a parameter for inverse-quantizing the quantized coordinate values.

9. A method of compressing shape-data used in an image generating apparatus, said method comprising:
   a first step of inputting shape data for a plurality of parts into the image generating apparatus, wherein the plurality of parts are obtained from partitioning a whole shape;
   a second step of obtaining a distribution of coordinate values of the shape-data for each part and determining quantizing parameters for quantizing each coordinate value of the shape-data for each part based on the respective distribution obtained; and
   a third step of quantizing each coordinate value of the shape-data for each part using the quantizing parameters determined in said second step;
   wherein the coordinates values of the shape data for each part are points of a set selected from a set of terminal points of lines, a set of middle points of lines, a set of vertices of surfaces, a set of center points of surfaces, a set of control points of surfaces, a set of center points of ellipses, and a set of center points of ellipsoids.

10. A method of decoding shape-data used in an image generating apparatus, said method comprising:

a first step of inputting quantized and compressed coordinate shape-data, including parameters of an inverse quantizing transformation for a plurality of parts, into the image generating apparatus, wherein the plurality of parts are obtained from partitioning a whole shape; and a second step of inverse-quantizing each coordinate of the shape-data by using the parameters of the inverse quantizing transformation;

wherein, one set of values selected from a set of quantization widths, a set of quantization precision, and a set of a quantization width and a quantization precision is used as the parameters of the inverse quantizing transformation for each coordinate.

11. A method of decoding shape-data as in claim 10, wherein said first and second steps are recursively executed to hierarchically decode shape-data which is hierarchically compressed.

12. A method of decoding shape-data as in claim 10, wherein normal vectors of surfaces in each part are used as the compressed shape-data.

13. A method of decoding shape-data used in an image generating apparatus, said method comprising:

a first step of inputting quantized and compressed coordinate shape-data, including parameters of an inverse quantizing transformation for a plurality of parts, into the image generating apparatus, wherein the plurality of parts are obtained from partitioning a whole shape; and a second step of inverse-quantizing each coordinate of the shape-data by using the parameters of the inverse quantizing transformation;

wherein the coordinates values of the compressed shape data for each part are points of a set selected from a set of terminal points of lines, a set of middle points of lines, a set of vertices of surfaces, a set of center points of surfaces, a set of control points of surfaces, a set of center points of ellipses, and a set of center points of ellipsoids.

14. A method of decoding shape-data as in claim 13, wherein said first and second steps are recursively executed to hierarchically decode shape-data which is hierarchically compressed.

15. A method of decoding shape-data as in claim 13, wherein normal vectors of surfaces in each part are used as the compressed shape-data.

16. A method of decoding shape-data used in an image generating apparatus, said method comprising:

a first step of inputting quantized and compressed coordinate shape-data, including parameters of an inverse quantizing and coordinate transformation for a plurality of parts, into the image generating apparatus, wherein the plurality of parts are obtained from partitioning a whole shape; and a second step of inverse-quantizing and coordinate transforming each coordinate of the shape-data by using the parameters of the inverse quantizing and coordinate transformation;

wherein the coordinates values of the compressed shape data for each part are points of a set selected from a set of terminal points of lines, a set of middle points of lines, a set of vertices of surfaces, a set of center points of surfaces, a set of control points of surfaces, a set of center points of ellipses, and a set of center points of ellipsoids.

17. The method of decoding shape-data as in claim 16, wherein said first and second steps are recursively executed to hierarchically decode shape-data which is hierarchically compressed.

18. The method of decoding shape-data as in claim 17, wherein the parameters of the inverse quantizing and coordinate transformation obtained in said first step are decoded as shape-data for at least one part on one level of hierarchy lower than a current level of hierarchy.

19. The method of decoding shape-data as in claim 16, wherein normal vectors of surfaces in each part are used as the compressed shape-data.

* * * * *